March 30, 1937. J. W. PEASE 2,075,750
SEED CELLING KNIFE
Filed Sept. 5, 1934
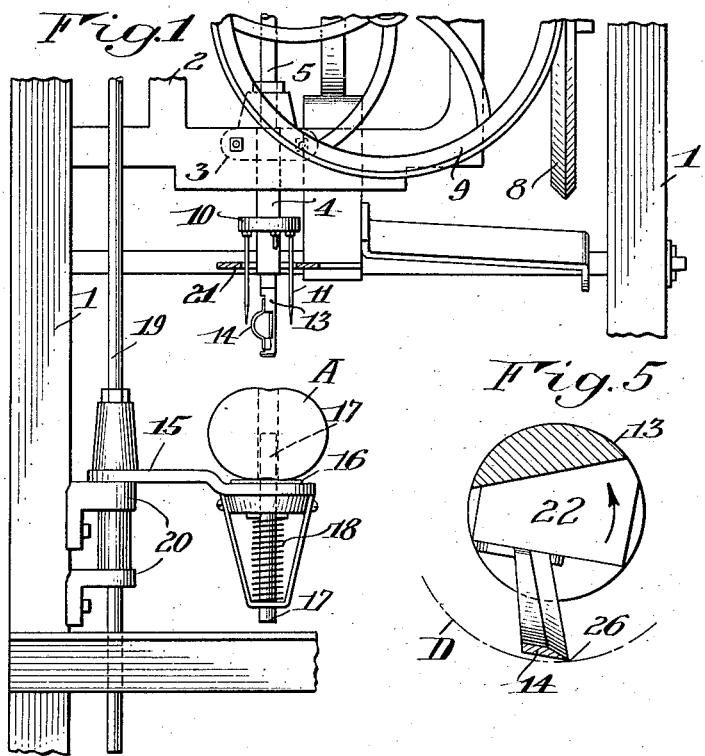
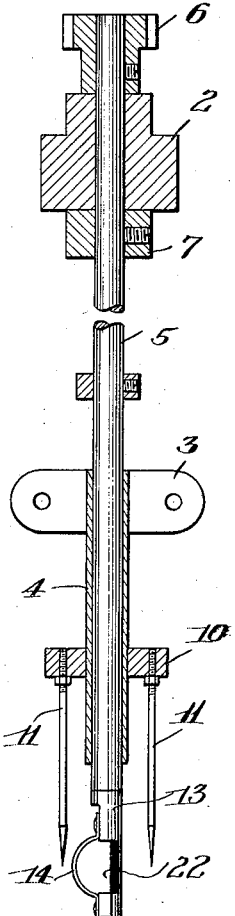
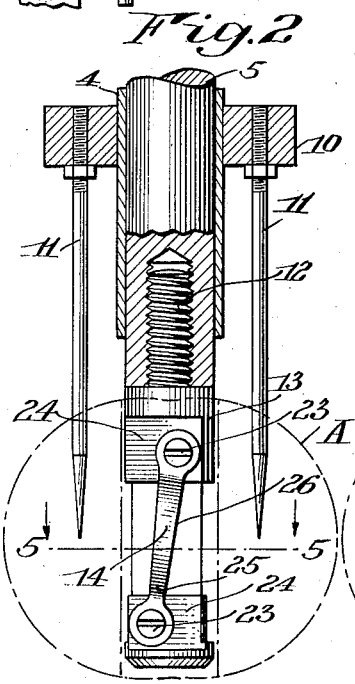
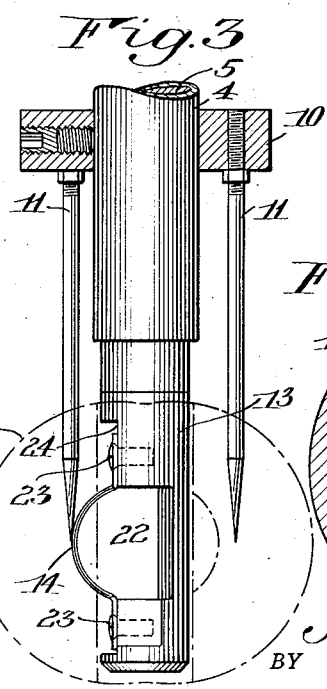
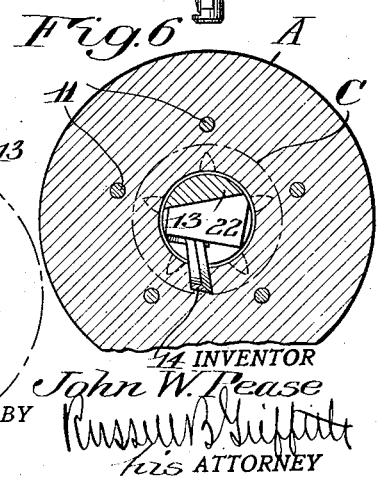
INVENTOR
John W. Pease
BY
his ATTORNEY Patented Mar. 30, 1937

2,075,750

UNITED STATES PATENT OFFICE 2,075,750

SEED CELLING KNIFE

John W. Pease, Rochester, N. Y.

Application September 5, 1934, Serial No. 742,773

3 Claims. (Cl. 146—52)

My present invention relates to fruit machinery and more particularly to machines for treating and preparing apples and similar fruit that have a centrally located seed and seed shell structure, and it has for its general object to provide an improved spindle head and blade for use in removing these seed cells in a driven machine and which will be efficient, sturdy and capable of production at a low manufacturing cost. The improvements are directed in part toward so shaping and fitting the blade that it will enter the core hole of an apple without "hogging" the pulp, will clear itself of the parings and will have a tendency to draw the cut toward the center of its rotation rather than impart expansive strains exerting splitting pressure upon the fruit.

To these and other ends, the invention resides in certain improvements and combinations of parts, all as will be more fully described, the novel features being pointed out in the claims at the end of this specification.

In the drawing:

Fig. 1 is a side elevation of a fragment of a seed celling machine for apples provided with a spindle head and blade constructed in accordance with and illustrating one embodiment of my invention, only the parts immediately cooperating therewith being included;

Fig. 2 is an enlarged front view of the blade and head with portions of the spindle and apple holding fork shown in vertical section;

Fig. 3 is an enlargement of the side view of the blade and head as it appears in Fig. 1, the apple retaining fork being in vertical section;

Fig. 4 is an enlarged side view of the head, blade and spindle, the latter broken away and with contiguous parts in vertical central section;

Fig. 5 is a further enlarged horizontal section taken on the line 5—5 of Fig. 2, and Fig. 6 is a duplication of the showing of Fig. 5 on a smaller scale with the addition that an apple is conventionally illustrated in horizontal section on the fork.

Similar reference numerals throughout the several views indicate the same parts.

The accompanying drawing shows my improved celling blade applied to a machine for seed celling previously cored apples, said machine being of the type fully disclosed in my prior copending application, Serial No. 503,496, filed December 19, 1930, so that only the parts in immediate coaction with the blade are illustrated. Referring more particularly thereto and first to Figs. 1 and 4, 1 indicates a main frame and 2 a supplementary frame on which latter is carried a bracket 3 supporting a vertical bearing sleeve 4 in which turns a spindle 5. The spindle also has an upper bearing in a portion of the frame 2, in which it is confined by a pinion 6 at the top and a set collar 7 beneath. The spindle is intermittently rotated by a driving gear 8 meshing with a cycle member 9 and, through suitable gearing, to the pinion 6, the idea being that the spindle will be at rest when an apple is presented for treatment, as hereinafter described, will rotate during the celling cut and will then come to rest again while the apple is being removed, the position of rest being always rotationally the same. In my said prior showing, a grooving device preceded the celling knife into the apple to make room for it. With my present invention, I can eliminate this additional grooving element through shaping and disposing the celling blade in a particular way.

Fixed to the sleeve bearing 4 is a fork ring 10 having secured thereto a plurality of spaced downwardly projecting tines 11 that are circularly arranged and which constitute means for holding the apple against rotation. The apple is impaled thereon in the position shown in dotted lines in Fig. 2 and Fig. 3 at A and in full lines in the section of Fig. 6. The tines 11 are outside of the seed cell area to be removed, indicated at C in Fig. 6, and support the apple with firmness while at the same time reenforcing it in a way against splitting strains from within.

Screwed into the lower end of the spindle 5 at 12 is the celling or cutter head 13 carrying the seed celling blade 14 hereinafter described in more detail, the blade being bowed to project laterally and make a sweeping cut in the area C. The machine may be used, so far as the seed celling operation is concerned, with a hand feed, that is, by placing the apples on the fork by hand, but I have shown a mechanical device for this purpose copied from my said previous application and which I will briefly describe. A feed arm 15 carries an apple supporting element 16 provided with a central yielding pin 17 supported by a spring 18. The feed arm is secured to a full rod 19 that reciprocates vertically in bearing brackets 20 on the frame 1. It is actuated by driving gear under the control of the cycle member 9 in timed relationship with the other mechanism. The rod 19 is also rotatable and the sequence of movement is that the arm 15 swings forwardly, a cored apple A is placed on a pin or post 17, the arm swings back with the apple into axial alinement with the head 13, and the holder is then drawn upwardly to impale the apple on the tines 11, as shown in Fig. 2. The head 13 enters the core hole until the blade 14 reaches the center of the apple, the pin 17 retreating from contact with the head. The feeding arm then lowers out of the way and swings forwardly to another apple, while in the meantime the spindle 12 is set in rotary motion and removes the seed cells. Finally, a suitably timed doffer 21 through an opening in which the tines 11 project swings downwardly and doffs the apple which is deflected to a proper depository or passed on for further treatment.

It is here that the advantages of my improvements become available, that is, in the cooperation of the blade 14 with the core hole of the apple. As before indicated, the blade is bowed or arcuate being nearly semi-circular. Behind or beneath it, the head 13 is provided with a recess 22 formed by cutting it away transversely and the blade bridges this recess and is detachably secured by screws 23 at both ends to flat indented faces 24 formed on the head on each side of the recess. Further than this, the lower end of the blade, that is, the end toward the tip of the head that first enters the apple is narrowed, as indicated at 25. The spindle 12 is designed to rotate to the left and the cutting edge of the blade is the edge 26 which is formed, as best shown in Figs. 5 and 6, by chamfering the under or inner side thereof. Additionally, the blade is not centrally arranged on the head, that is, the knife edge 26 is not in the plane of the axis but is inclined relatively thereto convergently in a direction toward the end or tip of the head.

The functions and advantages of these arrangements are as follows:

The blade being rigidly secured to the head at both ends is firm, non-yielding and accurate in its cutting rotation. The narrowed lower end eases it into the core hole of the apple followed by the shearing entrance of the inclined knife edge 26. Because of the same inclination, the ensuing rotational cut is a shearing cut instead of a square edge cut. As shown in Fig. 5, the cutting edge 26 is backed off or, rather, the blade is backed off from the cutting edge in its travel on the circle, indicated at D, and as the edge bites into the pulp of the apple, the chamfer has a tendency to pull the parings and litter inwardly relieving any outward or expanding strains on the apple. The recess or cut-away portion 22 in the head accommodates these parings which free themselves when the apple is doffed.

A celling knife and head constructed in accordance with my invention will be found to move relatively in and out of the core hole of an apple leaving hardly a trace and wasting practically none of the desirable pulp; will make a clean hollow in the region C of the seed cells and will practically never break or become distorted.

I claim as my invention:

1. In a seed celling machine for apples and the like, the combination with means for supporting a cored apple against rotation thereon, a spindle arranged axially of said supporting means to enter and to withdraw from the core hole of an apple on the support when said elements are moved relatively in an axial direction, means for rotating one of said elements relatively to the other, and a bowed seed celling knife blade projecting laterally from the head of the spindle and rigidly secured thereto at both ends, said blade having a cutting edge inclined convergently to the plane of the axis in a direction toward the end of the head.

2. In a seed celling machine for apples and the like, the combination with means for supporting a cored apple against rotation thereon, a spindle arranged axially of said supporting means to enter and to withdraw from the core hole of an apple on the support when said elements are moved relatively in an axial direction, means for rotating one of said elements relatively to the other, and a bowed seed celling knife blade projecting laterally from the head of the spindle and rigidly secured thereto at both ends, said blade having a tapered width narrowing toward the end of the head.

3. In a seed celling machine for apples and the like, the combination with means for supporting a cored apple against rotation thereon, a spindle arranged axially of said supporting means to enter and to withdraw from the core hole of an apple on the support when said elements are moved relatively in an axial direction, means for rotating one of said elements relatively to the other, and a bowed seed celling knife blade projecting laterally from the head of the spindle and rigidly secured thereto at both ends, the head of the spindle being recessed opposite to the blade to clear the parings therefrom and being provided with flat indented faces on opposite sides of the recess, the ends of the blade being detachably secured to such flat faces.

JOHN W. PEASE.